(12) United States Patent
Buck et al.

(10) Patent No.: US 8,787,560 B2
(45) Date of Patent: Jul. 22, 2014

(54) METHOD FOR DETERMINING A SET OF FILTER COEFFICIENTS FOR AN ACOUSTIC ECHO COMPENSATOR

(75) Inventors: Markus Buck, Biberach (DE); Gerhard Schmidt, Ulm (DE); Tobias Wolff, Neu-Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 867 days.

(21) Appl. No.: 12/708,172

(22) Filed: Feb. 18, 2010

(65) Prior Publication Data
US 2010/0215184 A1 Aug. 26, 2010

(30) Foreign Application Priority Data
Feb. 23, 2009 (EP) .................................. 09002542

(51) Int. Cl.
*H04M 9/08* (2006.01)
*G01S 15/00* (2006.01)
*H04R 3/00* (2006.01)

(52) U.S. Cl.
USPC .......................... 379/406.08; 367/103; 381/92

(58) Field of Classification Search
USPC .................................................... 379/406.01
See application file for complete search history.

(56) References Cited

U.S. PATENT DOCUMENTS

| | | | |
|---|---|---|---|
| 6,049,607 A | 4/2000 | Marash et al. | 379/410 |
| 6,421,377 B1 | 7/2002 | Langberg et al. | 375/222 |
| 6,442,275 B1 | 8/2002 | Diethorn | 379/406.14 |
| 6,510,225 B1 | 1/2003 | Robertson et al. | 379/406.1 |
| 6,738,480 B1 | 5/2004 | Berthault et al. | 381/66 |
| 6,839,426 B1 | 1/2005 | Kamoi et al. | 379/406.01 |
| 6,895,095 B1 | 5/2005 | Thomas | 381/94.7 |
| 7,359,504 B1 * | 4/2008 | Reuss et al. | 379/406.02 |
| 8,184,801 B1 * | 5/2012 | Hamalainen | 379/406.03 |
| 2002/0015500 A1 * | 2/2002 | Belt et al. | 381/66 |
| 2002/0176585 A1 | 11/2002 | Egelmeers et al. | 381/71.11 |
| 2003/0021389 A1 | 1/2003 | Hirai et al. | 379/3 |
| 2003/0091182 A1 | 5/2003 | Marchok et al. | 379/392.01 |

(Continued)

FOREIGN PATENT DOCUMENTS

| | | | |
|---|---|---|---|
| EP | 1 404 147 A2 | 3/2004 | H04R 3/00 |
| EP | 1 406 397 A1 | 4/2004 | H04B 3/23 |
| WO | WO 93/17510 | 9/1993 | H04J 1/00 |

OTHER PUBLICATIONS

European Patent Office, Extended European Search Report, Application No. 09002542.0-2225; Jul. 20, 2009.

Gänsler, et al., "An Adaptive Nonlinearity Solution to the Uniqueness Problem of Stereophonic Echo Cancellation," *IEEE*, Murray Hill, New Jersey, pp. 1885-1888, 2002.

(Continued)

*Primary Examiner* — Fan Tsang
*Assistant Examiner* — Jeffrey Lytle
(74) *Attorney, Agent, or Firm* — Daly, Crowley, Mofford & Durkee, LLP

(57) ABSTRACT

The invention provides a method for determining a set of filter coefficients for an acoustic echo compensator in a beamformer arrangement. The acoustic echo compensator compensates for echoes within the beamformed signal. A plurality of sets of filter coefficients for the acoustic echo compensator is provided. Each set of filter coefficients corresponds to one of a predetermined number of steering directions of the beamformer arrangement. The predetermined number of steering directions is equal to or greater than the number of microphones in the microphone array. For a current steering direction, a current set of filter coefficients for the acoustic echo compensator is determined based on the provided sets of filter coefficients.

21 Claims, 9 Drawing Sheets

(56) References Cited

U.S. PATENT DOCUMENTS

| | | | |
|---|---|---|---|
| 2003/0185402 A1 | 10/2003 | Benesty et al. | 381/66 |
| 2004/0013038 A1* | 1/2004 | Kajala et al. | 367/119 |
| 2004/0018860 A1 | 1/2004 | Hoshuyama | 455/569.1 |
| 2004/0120511 A1* | 6/2004 | Beaucoup et al. | 379/406.05 |
| 2004/0125942 A1* | 7/2004 | Beaucoup et al. | 379/406.01 |
| 2005/0213747 A1 | 9/2005 | Popovich et al. | 379/406.03 |
| 2006/0018459 A1 | 1/2006 | McCree | 379/406.06 |
| 2006/0062380 A1 | 3/2006 | Kim et al. | 379/406.01 |
| 2006/0067518 A1 | 3/2006 | Klinke et al. | 379/406.01 |
| 2006/0153360 A1* | 7/2006 | Kellermann et al. | 379/406.08 |
| 2006/0233353 A1 | 10/2006 | Beaucoup et al. | 379/406.01 |
| 2007/0093714 A1* | 4/2007 | Beaucoup | 600/437 |
| 2007/0274534 A1* | 11/2007 | Lockhart et al. | 381/92 |

OTHER PUBLICATIONS

Schmidt, et al., "Signal Processing for In-Car Communication Systems," *Elsevier*, pp. 1307-1326, 2005.

Benesty, et al., "A Hybrid Mono/Stereo Acoustic Echo Canceler," *IEEE Transactions on Speech and Audio Processing*, vol. 6, No. 5, pp. 468-475, Sep. 1988.

Kuo, et al., "Acoustic Noise and Echo Cancellation Microphone System for Videoconferencing," *IEEE Transactions on Consumer Electronics*, No. 4, pp. 1150-1158, Nov. 1995.

Sondhi, et al., "Adaptive Echo Cancellation for Speech Signals," 1991, pp. 327-356, 1991.

Storn, R., "Echo Cancellation Techniques for Multimedia Applications—a Survey," pp. 1-53, Nov. 1996.

* cited by examiner

METHOD FOR DETERMINING A SET OF FILTER COEFFICIENTS FOR AN ACOUSTIC ECHO COMPENSATOR

PRIORITY

The present application claims priority from European Patent Application No. 09002542.0 filed on Feb. 23, 2009 entitled "Method for determining a set of filter coefficients for an acoustic echo compensation means", which is incorporated herein by reference in its entirety.

TECHNICAL FIELD

The present invention relates to a method for determining a set of filter coefficients for an acoustic echo compensator. In particular, the invention relates to a method for determining a set of filter coefficients for an acoustic echo compensator in a beamformer arrangement.

BACKGROUND ART

In a beamformer arrangement, acoustic signals are processed in such a way, that signals from a preferred direction are enhanced with respect to signals from other directions. This characteristic is in particular useful for speech signal processing, for example, for hands-free telephone sets or speech recognition systems in vehicles.

For such systems, echo compensation is a basic issue. Disturbing echoes may result from signals which are, for example, output by a loudspeaker of the same system and detected together with the wanted signal by microphones of a microphone array in the beamformer arrangement. In the case of a hands-free telephone set, for instance, signals from a far end are output by a loudspeaker at the near end where they are again detected by the microphones. In order to avoid that these signals are transmitted back to the far end, echo compensation or echo cancellation has to be performed.

Several methods and systems for echo compensation are known (see, e.g. Acoustic Echo and Noise Control, E. Hänsler and G. Schmidt, John Wiley & Sons, New York, 2004).

One known method uses a separate acoustic echo compensator, for example an acoustic echo canceller, for each microphone signal. This method yields a very robust echo compensation but is computationally intensive. In particular, the computational costs increase with the number of microphones in a microphone array.

Alternatively, according to another method, only one acoustic echo compensator, for example an acoustic echo canceller, is used which operates after a beamformer, i.e. which operates on a beamformed signal. This method is computationally efficient as it requires only one acoustic echo compensator independent of the number of microphones in the microphone array.

However, when using only one acoustic echo compensator operating on the beamformed signal, residual echo components in the echo compensated signal can be observed when the beamformer changes from one steering direction to another. For example, in a vehicle, the beamformer may provide a steering direction corresponding to the position of a first speaker. If an utterance from a second speaker, at a different position, should be processed, the beamformer needs to provide a second steering direction according to the position of the second speaker.

After the change-over from the first steering direction to the second steering direction, the signal quality of the echo compensated beamformed signal can be impaired by the presence of a residual echo signal until the acoustic echo compensator have re-adapted for the second steering direction. This, however, may take some time.

FIG. 9 depicts a prior art system comprising a beamformer and a plurality of acoustic echo cancellers.

In particular, a microphone array comprising a plurality of microphones 901 is shown. A microphone 901 may detect signals from a loudspeaker 902 and/or from wanted sound sources, in particular, speakers 903. A steering direction 904 of the beamformer arrangement may be provided corresponding to the direction of arrival of a signal originating from one of the speakers 903. Speaker localization module 905 allow to determine the position of the speaker 903 and/or the direction of arrival of a wanted signal originating from the speaker 903. A beamformer 906 may be used to perform time delay compensation of the microphone signals. The beamformer may further process the time delay compensated microphone signals yielding a beamformed signal.

Before beamforming, acoustic echo cancellers 941 are used to perform echo compensation of each microphone signal individually. The beamformed and echo compensated signal may be provided to a hands-free system 910.

If echo compensation is performed before beamforming, for each microphone signal a separate acoustic echo canceller 941 needs to be used. Such a system, as for example shown in FIG. 9, has the advantage that if the beamformer 906 changes from one steering direction 904 to another, the acoustic echo cancellers 941 do not need to be re-adapted. In other words, the beamformer 906 uses echo compensated microphone signals. Therefore, a change from one steering direction 904 of the beamformer 906 to another has no influence on echo compensation.

A drawback of such a system as shown in FIG. 9, is, however, that using an individual acoustic echo canceller 941 for each microphone signal is computationally intensive, wherein the computational costs increase with the number of microphones 901 in the microphone array.

SUMMARY OF THE INVENTION

According to the present invention, a method for determining a set of filter coefficients for an acoustic echo compensator in a beamformer arrangement, wherein the beamformer arrangement comprises a microphone array, comprising at least two microphones, a beamformer yielding a beamformed signal based on microphone signals from each of the at least two microphones and an acoustic echo compensator operating on the beamformed signal for echo compensation of the beamformed signal, comprises:

providing a plurality of sets of filter coefficients for the acoustic echo compensator, each set of filter coefficients corresponding to one of a predetermined number of steering directions of the beamformer arrangement, wherein the predetermined number of steering directions is equal to or greater than the number of microphones in the microphone array, and for a current steering direction, determining a current set of filter coefficients for the acoustic echo compensator based on the provided sets of filter coefficients.

As for a current or arbitrary steering direction, a set of filter coefficients for the acoustic echo compensator can be determined or calculated based on the provided sets of filter coefficients, the method allows to improve the signal quality after a change-over to the current steering direction as compared to the prior art. A time intensive re-adaptation of the acoustic echo compensator for the current steering direction may become unnecessary.

A beamformer may combine microphone signals from each of the at least two microphones in such a way that signals from a preferred direction or steering direction are enhanced while signals from other directions are suppressed.

The signal processing performed by the beamformer may be a summation of filtered input signals, wherein the filtered input signals may comprise, for example, time delay compensated microphone signals. The coefficients of the filtering module, in particular the value of each coefficient, may be variable.

The microphone signals may be signals output by microphones of the microphone array.

The beamformer arrangement may comprise a localization module. The position of a wanted sound source and/or the direction of arrival of signals originating from a wanted sound source may be estimated, in particular using the localization module. The beamformer may provide a steering direction based on the estimated position and/or direction of arrival. Determining the position and/or direction of arrival may be performed using the microphone array. In particular, the localization may be performed based on microphone signals of two or more microphones of the microphone array.

The beamformer arrangement may comprise time delay compensator. A directional characteristic or steering direction of the beamformer arrangement may be formed by summation of time delay compensated microphone signals. The time delay compensator may be used to determine and/or compensate for time delays of the microphone signals. In particular, the time delay compensation may be performed for each microphone signal of the microphone array to compensate for relative time delays between the microphone signals.

The time delays may be due to signal propagation delays, in particular corresponding to a given or desired direction of arrival or a relative positioning of a wanted sound source with respect to the at least two microphones of the microphone array, for example with respect to the centroid or centre of gravity of the positions of the microphones.

Time delay compensation of the microphone signals may be performed using the beamformer. The time delay compensated microphone signals may be summed using the beamformer. Thereby a steering direction of the beamformer arrangement, in particular of the beamformer, may be provided. In other words, the beamformer may provide a steering direction by summing time delay compensated microphone signals, wherein the time delays of the microphone signals may be determined based on the position or direction of the wanted sound source.

The beamformer arrangement may be connected with a loudspeaker, in particular with a loudspeaker signal path, in particular with the input signal path of the loudspeaker. The acoustic echo compensator may be provided with an input signal for the loudspeaker, i.e. a loudspeaker signal. An echo signal may correspond to the loudspeaker signal. In particular, the echo signal may be output by the loudspeaker. The echo signal may correspond, for example, to output of a hands-free system.

The acoustic echo compensator may use the loudspeaker signal as reference signal to model an echo signal component in the beamformed signal.

In particular, the acoustic echo compensator may be used to estimate the signal components of the beamformed signal which correspond to an echo signal. In other words, the acoustic echo compensator may be used to model a serial connection of a loudspeaker-room-microphone system and a beamformer, in particular by means of a transfer function. A transfer function may model the relation between the input and the output signals of a system. In particular, a transfer function applied to an input signal may yield the output signal of the system. Transfer functions of the loudspeaker-room-microphone system may represent the relation between a loudspeaker signal, output by the loudspeaker and received by the microphones via the room, and the microphone signals, output by each of the microphones.

A transfer function of the serial connection of the loudspeaker-room-microphone system and the beamformer, or loudspeaker-room-microphone-beamformer system, may represent the relation between a loudspeaker signal, output by the loudspeaker, received by the microphones via the room and processed by the beamformer, and the beamformed signal.

The echo signal components may be subtracted from the beamformed signal to yield an echo compensated beamformed signal.

The acoustic echo compensator may comprise an echo compensation filter or an acoustic echo canceller. The acoustic echo compensator may be an acoustic echo canceller.

The acoustic echo compensator may comprise an, in particular adaptive, FIR filter.

The number of filter coefficients in each set of filter coefficients for the acoustic echo compensator may depend on the order of the FIR filter used, i.e. the number of filter coefficients used for the FIR filter. An $N^{th}$ order FIR filter may use (N+1) filter coefficients. Therefore, the number of filter coefficients in each or in an arbitrarily chosen set of filter coefficients may take any finite value larger than or equal to one.

A set of filter coefficients may correspond to a steering direction. In particular, a provided set of filter coefficients may correspond to one of the predetermined number of steering direction. A current set of filter coefficients may correspond to a current steering direction.

The number of filter coefficients in each provided set of filter coefficients may equal the number of filter coefficients in the current set of filter coefficients to be determined.

The number of provided sets of filter coefficients may be equal to or greater than the number of microphones in the microphone array. In particular, the number of provided sets of filter coefficients may be equal to the predetermined number of steering directions.

The current steering direction may be an arbitrary steering direction.

A steering direction or preferred direction of the beamformer arrangement, in particular of the beamformer, may correspond to the direction of a major lobe of a directional characteristic of the beamformer arrangement, in particular of the beamformer. The major lobe of a directional characteristic may be aligned with a direction of arrival of a signal originating from a wanted sound source. In particular, a directional characteristic of the beamformer may have only one major lobe. The predetermined number of steering directions may correspond to a predetermined number of directional characteristics.

A current steering direction may correspond to the direction in which a wanted sound source is located or to the direction of arrival of a wanted sound signal, in particular one emitted from the wanted sound source.

The direction of arrival may change with time, for example, if the wanted sound source moves or if signals originating from a second wanted sound source should be detected. The beamformer may provide different steering directions, in particular in response to a change of the direction of arrival, thus resulting in a plurality of steering directions.

A steering direction may be specified by one, two or three parameters or coordinates. The one, two or three parameters or coordinates may comprise an angle with respect to a predetermined axis. The predetermined axis may be a direct access of a linear microphone array, wherein the microphones of the linear microphone array are arranged along the direct axis.

A predetermined steering direction may correspond to one of the predetermined number of steering directions. The current steering direction or arbitrary steering direction may be, in particular, different from each of the predetermined steering directions.

A steering direction of the beamformer may correspond to a direction, in particular with respect to the beamformer arrangement, wherein signals originating from that direction are enhanced with respect to signals from other directions. This directional pattern may be formed by summation of time delay compensated microphone signals using the beamformer.

A steering direction may correspond to a set of time delays comprising a time delay for each microphone signal of the microphone array. Time delays may be calculated from a steering direction and/or vice versa. In particular, the predetermined number of steering directions may correspond to a predetermined number of sets of time delays.

A steering direction may be provided, adjusted or changed to another steering direction by providing, adjusting or changing time delay parameters of the time delay compensator, in particular of the beamformer. A time delay parameter may correspond to the time delay of a microphone signal.

The time delays or time delay parameters may be determined based on the position of a wanted sound source and/or the direction of arrival of a signal originating from the wanted sound source. The time delay and/or time delay parameter may be determined for each microphone signal of the microphone array.

The time delay may be a relative time delay, in particular, with respect to an arbitrarily chosen or predetermined microphone signal.

In the frequency domain, the relative time delay may correspond to a relative phase shift.

The step of determining a current set of filter coefficients may be followed by initializing the acoustic echo compensator using the determined current set of filter coefficients. In particular, the filter coefficients for the acoustic echo compensator may be set to the determined values of the determined current set of filter coefficients.

Determining a current set of filter coefficients may be based on a combination of provided sets of filter coefficients. In particular, current filter coefficients for the current set of filter coefficients may be determined, calculated or computed based on a combination of filter coefficients of the provided sets of filter coefficients, in particular corresponding to different predetermined steering directions.

The step of determining a current set of filter coefficients may be preceded by determining, for each microphone signal, a current time delay corresponding to the current steering direction, and determining a current set of filter coefficients may be further based on the current time delays. In other words, for the current steering direction, determining a current set of filter coefficients may be based on the provided sets of filter coefficients and on the current time delays.

Determining a current set of filter coefficients may further comprise, for each filter coefficient of the current set of filter coefficients, computing a sum, wherein each summand comprises a modified transfer function corresponding to a combination of (a) filter coefficients of the beamformer and (b) transfer functions, in particular transfer functions of a loudspeaker-room-microphone system. In other words, the transfer functions may be transfer functions between a loudspeaker signal, emitted by a loudspeaker, and each microphone signal of the microphone array.

The modified transfer functions may correspond to beamformer coefficients in combination with transfer functions of the loudspeaker-room-microphone system. One modified transfer function may correspond to each microphone signal and each filter order of the acoustic echo compensator.

Each summand may correspond to a particular microphone signal.

Each summand of the sum may further comprise a time delay function, wherein the time delay function is a function of the time delay of the microphone signal. In particular, the time delay functions may be exponential functions of a time delay, in particular of a relative time delay. The exponential functions may further comprise a sound frequency. In particular, the sound frequency may be the central frequency of an arbitrary or predetermined frequency band.

Each summand, may, in particular, be a product of a function depending on a steering direction, in particular on a time delay function, and a modified transfer function. In particular, the modified transfer functions may be independent of the current steering direction.

In this way, the functional dependence of the filter coefficients for the echo compensator on the current steering direction, in particular on the current time delay, can be incorporated in a separate term.

Determining a current set of filter coefficients may comprise determining modified transfer functions, in particular, a modified transfer function for each summand.

Determining a current set of filter coefficients, in particular determining the modified transfer function of each summand, may be based on predetermined time delays corresponding to predetermined steering directions. In particular, determining the modified transfer functions may be based on the provided sets of filter coefficients and the predetermined time delays.

Determining the modified transfer functions may comprise solving a linear system of equations. The system of equations may contain terms only depending on provided filter coefficients of the provided sets of filter coefficients and the predetermined time delays.

Solutions to the system of equations may yield a modified transfer function for each summand, i.e. for each microphone signal, in particular given an arbitrary filter order.

In particular, computing the sum may comprise determining the modified transfer functions based on combinations of provided filter coefficients from the provided sets of filter coefficients, in particular corresponding to different steering directions.

In particular, determining modified transfer functions may comprise setting up a system of equations, wherein each provided filter coefficient of the provided sets of filter coefficients may be written as a sum, wherein, in particular, each summand may be a product of a modified transfer function and a time delay function of a predetermined time delay. The predetermined time delay may correspond to the predetermined steering direction corresponding to the provided set of filter coefficients.

Determining modified transfer functions may comprise solving the system of equations, in particular for a given filter order and a given microphone signal. Solving the system of equations may be performed for all wanted or desired filter orders and all microphone signals.

In particular, from the provided sets of filter coefficients, filter coefficients corresponding to different predetermined steering directions but corresponding to the same filter order may form a filter coefficients vector. The modified transfer functions corresponding to a given filter order may form a transfer vector.

Solving the system of equations may comprise inverting a matrix. In particular, the matrix and the inverted matrix may contain coefficients only depending on the predetermined time delays.

The system of equations may be written as a matrix multiplication. The filter coefficients vector may be a product of a matrix and the transfer vector. The matrix may contain coefficients only depending on the predetermined time delays.

The transfer vector, in particular the modified transfer functions, may be calculated by inverting the matrix. This can happen numerically in a computationally efficient way.

The providing step may comprise for each of the predetermined number of steering directions providing a predetermined time delay for each microphone signal corresponding to a predetermined steering direction. In this way, for each of the predetermined number of steering directions, a set of filter coefficients for the echo compensator and a time delay for each microphone signal may be provided.

The predetermined time delays may correspond to predetermined relative time delays.

The providing step may comprise for each of the predetermined number of steering directions, determining a time delay for each microphone signal corresponding to the predetermined steering direction, and storing the time delay for each microphone signal, thus, resulting in predetermined time delays.

The providing step may comprise for each of the predetermined number of steering directions, adapting the acoustic echo compensator for the predetermined steering direction, and storing a set of filter coefficients for the acoustic echo compensator corresponding to the predetermined steering direction, thus, resulting in provided sets of filter coefficients.

The provided sets of filter coefficients, the predetermined steering directions and/or the predetermined time delays may be determined using the beamformer arrangement. In particular, the provided sets of filter coefficients, predetermined steering directions and/or the predetermined time delays may be determined in an initializing phase or initialization period. In particular, during the initializing phase, the provided sets of filter coefficients and/or the predetermined relative time delays may be determined for a predetermined number of steering directions, wherein the predetermined number of steering directions may be at least equal to the number of microphones in the microphone array.

The step of adapting the acoustic echo compensator may be performed such that the quality of echo compensation exceeds a predetermined threshold. In this way, it can be assured that the provided set of filter coefficients yield an optimal echo compensation for the corresponding predetermined steering direction.

The initializing phase may be ended when the number of different steering directions for which sets of filter coefficients have been determined equals the number of microphones in the microphone array. The initializing phase, in particular the steps of the initializing phase, may be performed repeatedly, in particular at different times.

Determining the current set of filter coefficients may be performed after the initializing phase or after the number of different steering directions for which sets of filter coefficients are provided equals the number of microphones in the microphone array.

The step of determining a current set of filter coefficients may be preceded by determining whether the current steering direction deviates or differs from a preset steering direction, and if the current steering direction deviates or differs from the preset steering direction, determining the current set of filter coefficients. In particular, determining the current set of filter coefficients may be performed only if the current steering direction deviates or differs from the preset steering direction. In this way, after a change from one steering direction to another, the filter coefficients for the acoustic echo compensator can be set such that residual echo after the change will be reduced or even completely cancelled, in particular in a shorter time as compared to the prior art.

Determining a current set of filter coefficient for the acoustic echo compensator may be performed in the frequency domain or in the time domain.

Relative time delays in the time domain may correspond to relative phase shifts in the frequency domain. A transfer function in frequency domain may correspond to an impulse response in time domain.

Determining a current set of filter coefficient of the acoustic echo compensator may be performed in the frequency domain further comprising sub-band coding. In this way, steps of the methods may be performed independently for each frequency band. In particular, in each frequency band undersampling may be performed. In this way, the computing time can be reduced.

The provided sets of filter coefficients for the acoustic echo compensator may be updated using a second beamformer and a second acoustic echo compensator.

The transfer functions may be variable, as a loudspeaker-room-microphone system may be time variant, for example, due to a moving person in the room. The provided sets of filter coefficients may correspond to transfer functions of the loudspeaker-room-microphone-beamformer system. Hence, in order to account for changes in the loudspeaker-room-microphone system, the provided sets of filter coefficients may be updated repeatedly.

A second beamformer may be used to provide a directional characteristic or steering direction which corresponds to one of the predetermined steering directions corresponding to a provided set of filter coefficients. The second acoustic echo compensator may adapt for the predetermined steering direction, thereby obtaining a new set of filter coefficients. The adaptation may be performed such that the quality of echo compensation exceeds a predetermined threshold.

In particular, updating a provided set of filter coefficients may comprise the steps of setting the time delay parameters of the second beamformer according to a predetermined steering direction corresponding to one of the provided sets of filter coefficients, adapting the second acoustic echo compensator for the predetermined steering direction, yielding a new set of filter coefficients, and replacing the provided set of filter coefficients with the new set of filter coefficients. In particular, replacing the provided set of filter coefficients with the new set of filter coefficients may be performed only if the quality of echo compensation exceeds a predetermined threshold.

The step of updating a provided set of filter coefficients may be performed for all provided sets of filter coefficients, in particular subsequently and repeatedly.

The step of determining a current set of filter coefficients may be followed by storing the determined current set of filter coefficients and/or the current steering direction. Thereby a provided set of filter coefficients and a predetermined steering direction may be obtained. In this way, the predetermined number of steering directions may be increased. If determining modified transfer functions comprises solving a linear system of equations, the system of equations may be enlarged in this way. In particular, the current time delay for each microphone system corresponding to the current steering direction may be stored thereby obtaining predetermined time delays.

The above-described methods may further comprise determining the quality of echo compensation corresponding to a set of filter coefficients and the corresponding steering direction, according to a predetermined criterion.

In particular, the methods may comprise searching among the provided sets of filter coefficients, a particular set of filter coefficients, wherein the quality of echo compensation using the current set of filter coefficients exceeds the quality of echo compensation using the particular set of filter coefficients and wherein a set of steering directions comprising the current steering direction and all predetermined steering directions other than the predetermined steering direction corresponding to the particular set of filter coefficients, contains a predetermined number of steering directions which is at least equal to the number of microphones in the microphone array and if such a particular set of filter coefficients is found, replacing the particular set of filter coefficients and the corresponding predetermined steering direction with the determined current set of filter coefficients and the corresponding current steering direction.

In this way, the provided sets of filter coefficients can be updated. In particular, the provided sets of filter coefficients which yield a low quality of echo compensation may be subsequently replaced by sets of filter coefficients yielding a better quality of echo compensation.

The quality of echo compensation using the particular set of filter coefficients may be worse than the quality of echo compensation using any other provided set of filter coefficients. In this way, the provided set of filter coefficients which yields the lowest quality of echo compensation may be replaced.

In particular, the predetermined time delays corresponding to the set of filter coefficients which yields the lowest quality of echo compensation may be replaced with the current time delays.

Searching the particular set of filter coefficients may comprise comparing parameters indicating the quality of echo compensation. A parameter indicating the quality of echo compensation may be determined for the current set of filter coefficients and for the provided sets of filter coefficients. For each provided set of filter coefficients, a parameter indicating the quality of echo compensation may be stored. In particular, the providing step may further comprise for each of the predetermined number of steering directions providing a parameter indicating the quality of echo compensation using the set of filter coefficients corresponding to the predetermined steering direction.

The method may further comprise storing a time indicating when a provided set of filter coefficients corresponding to a predetermined steering direction was determined. In particular, the providing step may further comprise for each of the predetermined number of steering directions providing a time stamp or time parameter indicating when or for what time the corresponding provided set of filter coefficients was determined.

The determined current set of filter coefficients may replace an older provided set of filter coefficients. In particular, the determined current set of filter coefficients may replace the oldest provided set of filter coefficients.

In this way, the oldest provided set of filter coefficients may be subsequently replaced with a newer one.

The method may further comprise determining or estimating a position of a wanted sound source and/or a direction of arrival of a signal originating from the wanted sound source.

In particular, the method may comprise providing a steering direction of the beamformer corresponding to the determined position and/or direction of arrival. In particular, the major lobe of a directional characteristic may be aligned with the determined position and/or direction of arrival.

The step of providing a steering direction may comprise time delay compensation for each microphone signal of the microphone array with a time delay determined based on the determined or estimated position and/or direction of arrival. The time delays may change with time. Time delay compensation using time dependent or time variable time delays is usually called "adaptive time delay compensation".

The determined current set of filter coefficients may be further modified using the acoustic echo compensator, in particular using adaptive filtering module of the acoustic echo compensator. In this way, echo compensation after a change from one steering direction to another can be further optimised. The step of modifying the determined set of filter coefficients may be followed by storing the modified current set of filter coefficients and/or the current steering direction. In particular, updating or replacing provided sets of filter coefficients may be done using modified current sets of filter coefficients.

Furthermore, the present invention provides a computer programme product, comprising one or more computer readable media, having computer executable instructions for performing the steps of one of the above described methods when run on a computer.

The invention further provides an apparatus for determining a set of filter coefficients for an acoustic echo compensator in a beamformer arrangement, wherein the beamformer arrangement comprises a microphone array comprising at least two microphones, a beamformer yielding a beamformed signal based on microphone signals from each of the at least two microphones and an acoustic echo compensator operating on the beamformed signal for echo compensation of the beamformed signal, the apparatus comprising filter coefficients determining module configured to perform one of the above described methods.

The invention further provides a hands-free system comprising an apparatus as described above. In particular, the hands-free system may be a hands-free telephone set or a hands-free speech control set, in particular for use in a vehicle.

The invention further provides a system comprising a microphone array comprising at least two microphones, a beamformer, an acoustic echo compensator and an above-described apparatus.

The system may further comprise a memory and/or a localization module for determining a position of a wanted sound source and/or a direction of arrival of a signal originating from the wanted sound source.

The wanted sound source may be a speaker, and/or the microphone signal may comprise a speech signal.

The system may further comprise a predetermination module, configured to store for each of a predetermined number of steering directions, a time delay for each microphone signal. The predetermination module may be configured to store for each of a predetermined number of steering directions a set of filter coefficients for the acoustic echo compensator. In this way, the predetermination module may be used to provide sets of filter coefficients and predetermined time delays for each of a predetermined number of steering directions.

The predetermination module may be used, in particular, during an initializing phase.

The system may further comprise a second beamformer and a second acoustic echo compensator, if provided sets of filter coefficients are updated using a second beamformer and a second acoustic echo compensator.

The system may further comprise module for determining a time delay for time delay compensation of one or more microphone signals.

The system may further comprise module for time delay compensation of one or more microphone signals based on the determined time delays. The system may comprise a loudspeaker.

The above-described systems may be used in a vehicle.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 8:
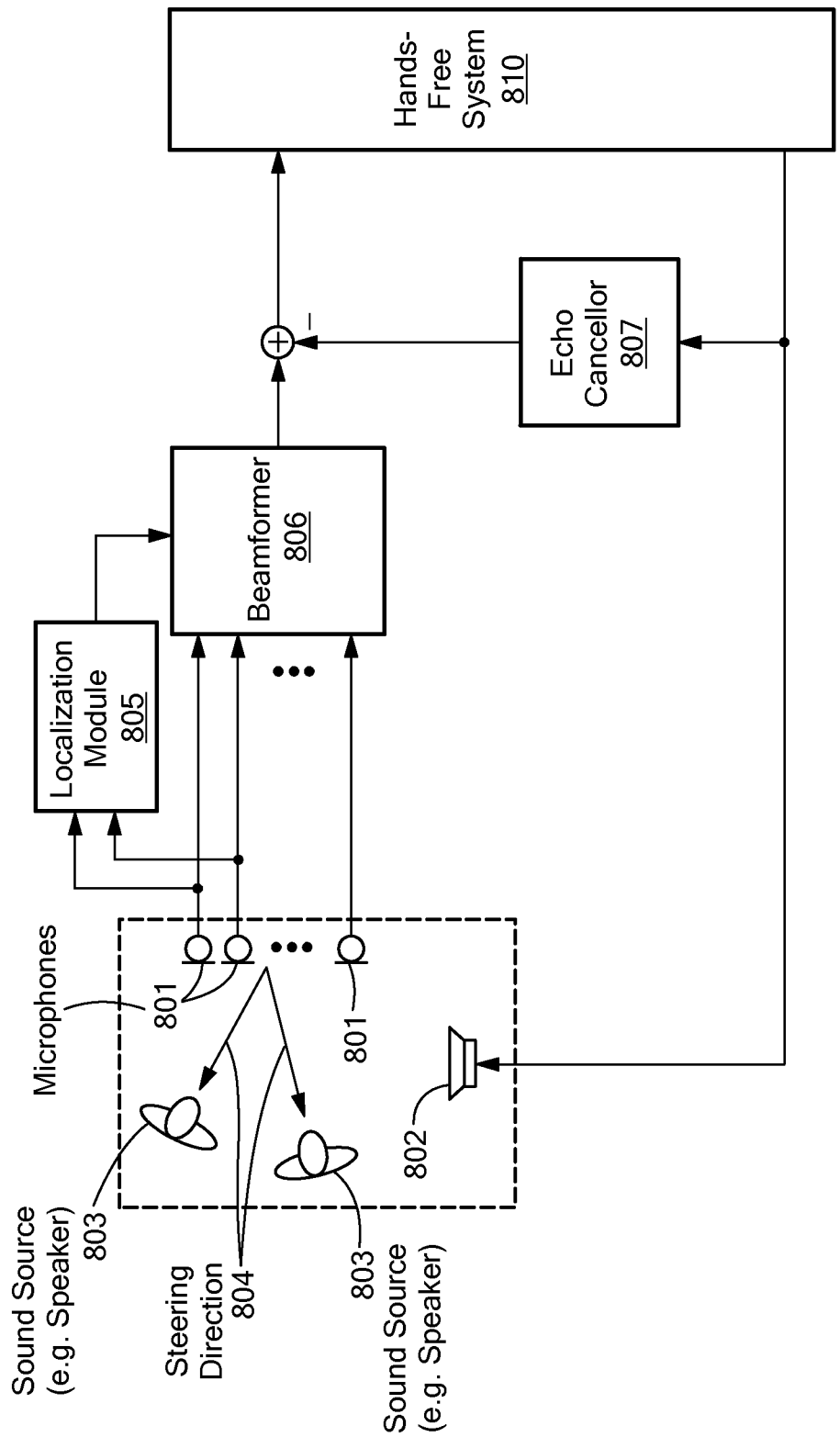
FIG. 8 shows an example of a beamformer arrangement comprising an acoustic echo canceller operating on a beamformed signal.
Figure 9:
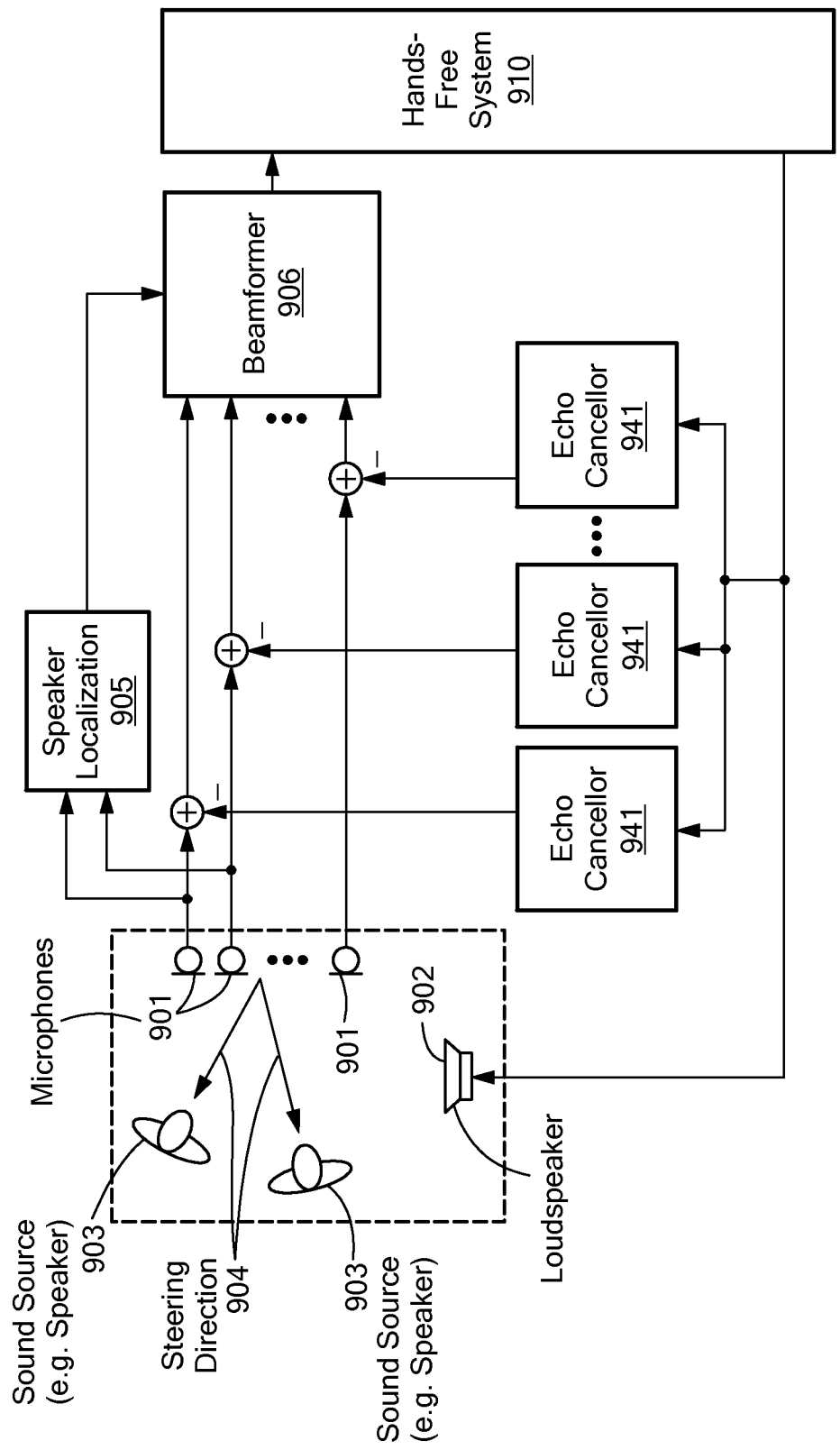
FIG. 9 shows an embodiment of a beamformer arrangement comprising a plurality of acoustic echo cancellers, each operating on a microphone signal.

The system shown in FIG. 8 comprises a beamformer arrangement comprising a beamformer 806, localization module 805, a microphone array comprising a number of microphones 801 and an acoustic echo canceller 807. Furthermore a hands-free system 810, speaker 803, a loudspeaker 802 and two different steering directions 804 of the beamformer arrangement are shown.

In the embodiment shown in FIG. 8, only one acoustic echo canceller 807 is used that operates on a beamformed signal. Hence, a beamformer 806 yields a beamformed signal based on the microphone signals and the acoustic echo canceller 807 is used to model the loudspeaker-room-microphone-beamformer system.

The advantage of such a system, as shown in FIG. 8, is that only one acoustic echo canceller 807 is used which is computationally more efficient than performing echo compensation for each microphone signal independently. However, if the beamformer changes from one steering direction 804 to another, new steering direction, the acoustic echo canceller 807 has to be re-adapted. In other words, each time the coefficients of the beamformer filter change, the filter coefficients of the acoustic echo canceller 807 have to be re-adjusted. Until the coefficients of the acoustic echo canceller 807 have converged to a new optimal solution corresponding to the new steering direction, the signal quality of the beamformed and echo compensated signal may be impaired.

Figure 1:
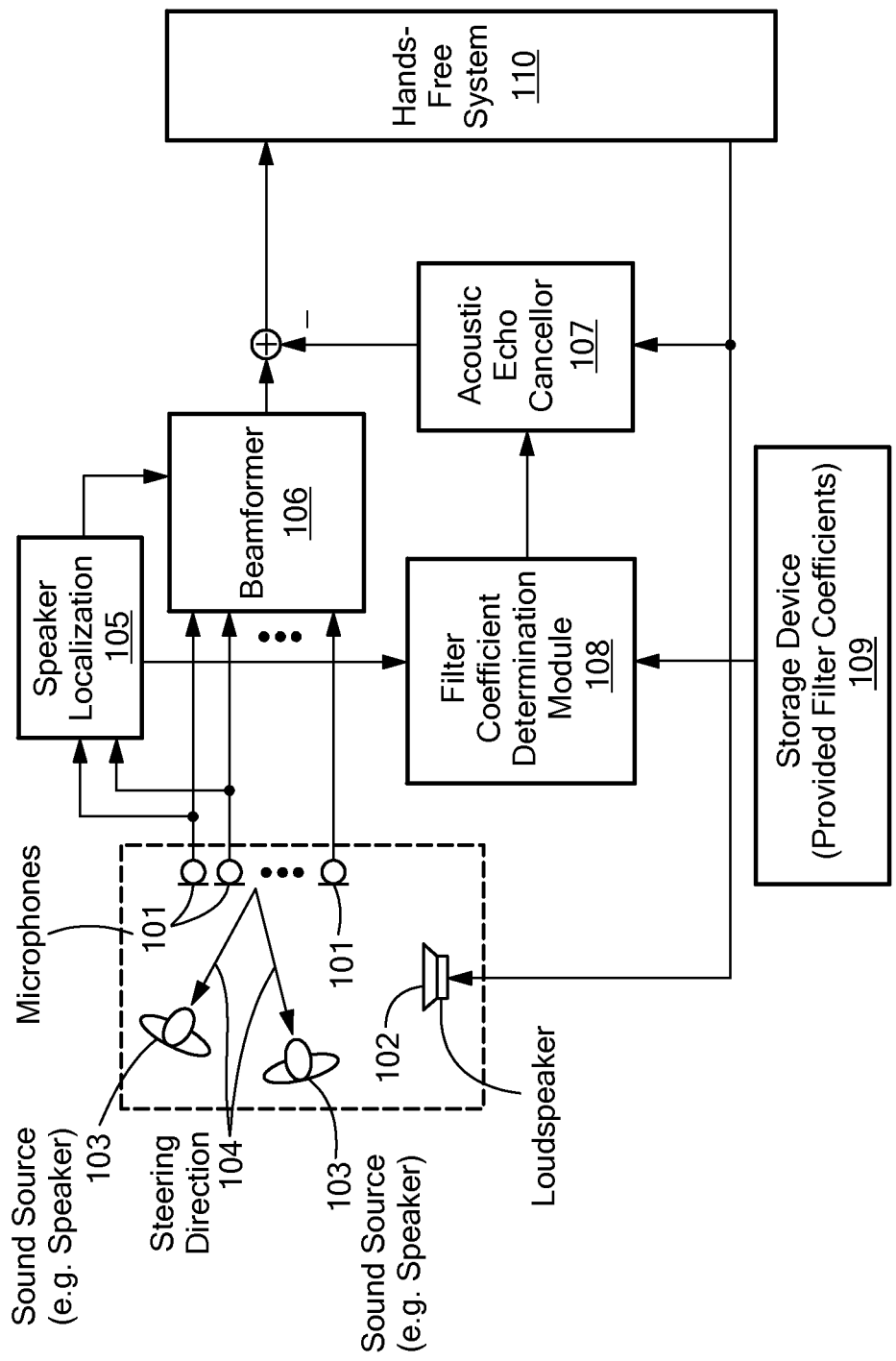
FIG. 1 shows a system comprising a beamformer arrangement comprising a microphone array, a beamformer and an acoustic echo canceller.

In FIG. 1, a system comprising a beamformer arrangement is shown. The system comprises a microphone array with microphones 101. The microphones may detect signals from a loudspeaker 102 and/or from wanted sound sources, in particular, speakers 103. The beamformer may provide one of the steering directions 104 corresponding to the direction of arrival of a signal originating from a wanted sound source and/or to a position of the wanted sound source. A speaker localization module 105 is used to determine the position and/or the direction of arrival, in particular the position or direction of a speaker 103. As used in this specification and in the claims, the term module may refer to circuitry, such as an ASIC (application specific integrated circuit), computer logic, such as computer program code, or a combination of the two, such as, a computer system having a processor that is made operational with the use of computer code. A beamformer 106 may determine a relative time delay for each microphone signal based on the relative positioning of the speaker 103 with respect to the microphones 101. The beamformer 106 may further add the time delay compensated microphone signals yielding a beamformed signal and an acoustic echo canceller 107 may operate on the beamformed signal for compensation or cancellation of echo components in the beamformed signal.

The filter coefficients for the acoustic echo canceller 107 may be determined by filter coefficients determining module 108 wherein a set of filter coefficients is determined based on provided sets of filter coefficients. The provided sets of filter coefficients may be stored in a storage device 109. The beamformed and echo compensated signals may be used by a hands-free system 110. The hands-free system 110 may be, for example, a hands-free telephone set or a hands-free speech control system, in particular operated in an automobile.

Figure 2:
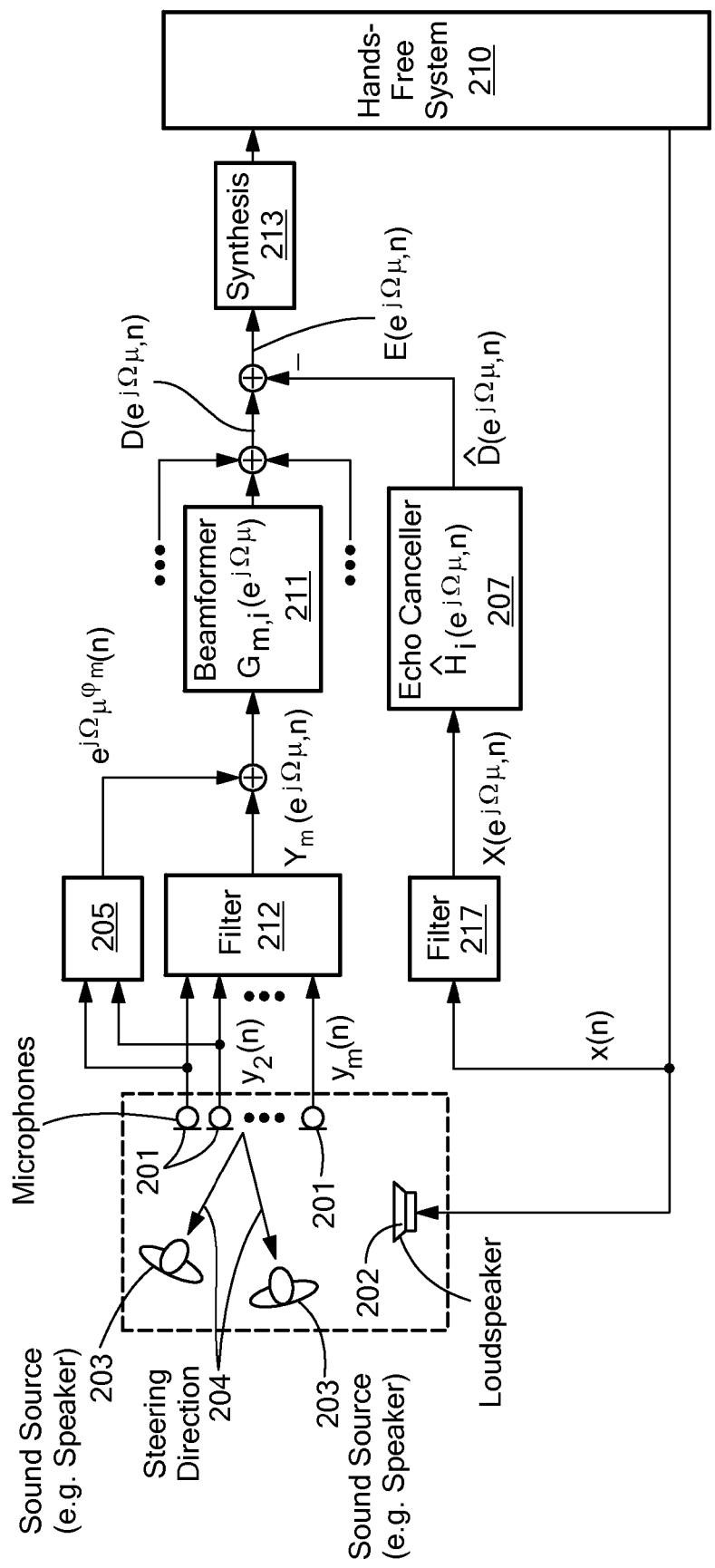
FIG. 2 shows an embodiment comprising a broadside beamformer and filtering module.

In FIG. 2, a system comprising a beamformer arrangement is shown which comprises filtering module 212 and synthesis module 213 to perform sub-band coding. A broadside beamformer 211 is used to output a beamformed signal based on the microphone signals. Alternatively an end-fire beamformer may be used.

Microphones 201 detect acoustic signals yielding microphone signals $y_m(n)$. The reference signal of a loudspeaker 202 may be denoted by $x(n)$. The microphone signals and the loudspeaker signal may be sub-band coded by filtering module 212 yielding frequency band components $Y_m(e^{j\Omega_\mu},n)$ and $X(e^{j\Omega_\mu},n)$. Due to the reduced bandwidth of each frequency band, undersampling of the signals may be possible. The parameter n denotes the time. In particular, n may denote a point in time, corresponding to the time when the acoustic signal was detected or emitted. $\Omega_\mu$ denotes a frequency of the frequency band, in particular the central frequency.

Providing a steering direction, i.e. aligning the direction of the major lobe of the directional characteristic of the beamformer, may comprise applying complex factors, in particular with an absolute value equal to 1, to the microphone signals. These factors, when multiplied with the microphone signals, may, in particular only, modify the phase of the microphone signal in the respective frequency band. A subsequent combination of the time delay compensated microphone signals may be performed by a broadside beamformer 211. The beamformed signal $\tilde{D}$ in a frequency band may read:

$$\hat{D}(e^{j\Omega_\mu}, n) = \sum_{m=1}^{M} \sum_i Y_m(e^{j\Omega_\mu}, n-i) e^{j\Omega_\mu \varphi_m(n-i)} G_{m,i}(e^{j\Omega_\mu}).$$

Here, the second summation corresponds to a convolution. For FIR filters, the sum may run from i=0 to the filter order minus 1. Furthermore, the parameter M denotes the number of microphones 201 in the microphone array, $\phi_m(n)$ denotes the relative time delay for microphone signal m which is a function of time n. $G_{m,i}(e^{j\Omega_\mu})$ denote the filter coefficients of the beamformer. The filter coefficients $G_{m,i}$ may be assumed to be independent of time.

Figure 3:
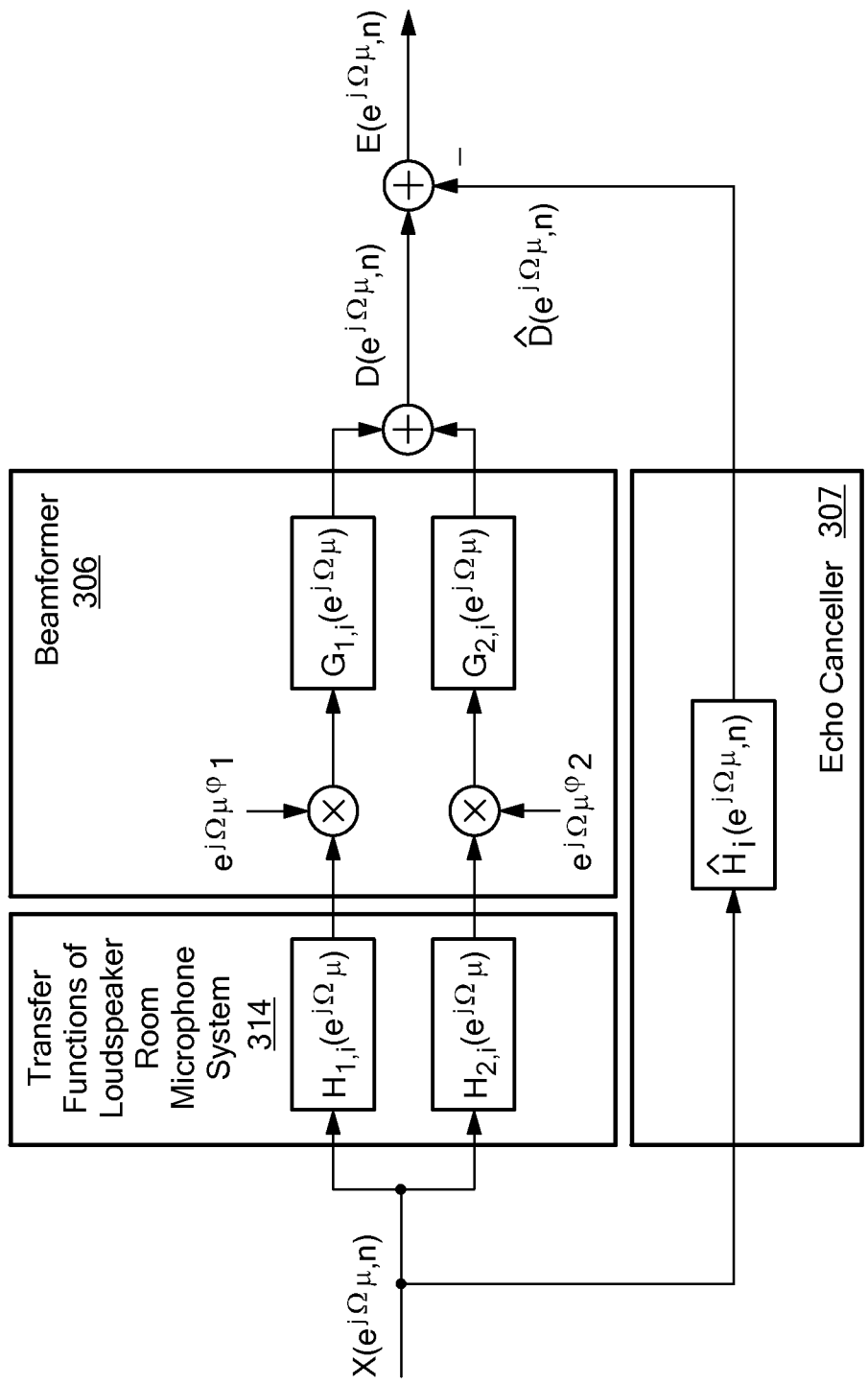
FIG. 3 shows a schematic view of a loudspeaker-room-microphone system, a beamformer and an acoustic echo canceller.

A schematic view of the system depicted in FIG. 2 is shown in FIG. 3. The filter coefficients for the acoustic echo canceller 307 are denoted by $\hat{H}_i$, while the transfer functions of the loudspeaker-room-microphone system 314 are denoted by $\hat{H}_{1,i}$ and $H_{2,i}$. The schematic view shown in FIG. 3 assumes two microphones in the microphone array and that no noise and no wanted signals are present. In this case, the beamformed signal comprises only an echo signal component $D(e^{j\Omega_\mu},n)$. The beamformer 306 may perform time delay compensation by multiplying with the complex factors $\exp(j\Omega_\mu \phi_1)$ and $\exp(j\Omega_\mu \phi_2)$. The filter coefficients of the beamformer 306 are denoted by $G_{1,i}$ and $G_{2,i}$ respectively. The estimated echo signal component in the frequency band is denoted by $\hat{D}$. Assuming a perfect adaptation of the acoustic echo canceller 307, the error signal E will be zero, i.e.

$$E(e^{j\Omega_\mu},n) = 0 = D(e^{j\Omega_\mu},n) - \hat{D}(e^{j\Omega_\mu},n).$$

The estimated echo signal, $\hat{D}$, may be determined by convolution of the loudspeaker signal or reference signal with the impulse response of the acoustic echo canceller 307, i.e.

$$\hat{D}(e^{j\Omega_\mu}, n) = \sum_i X(e^{j\Omega_\mu}, n-i) \hat{H}_i(e^{j\Omega_\mu}, n).$$

To determine the echo signal component in the beamformed signal, i.e. after the beamformer, coefficients of the convolution of the reference signal with the loudspeaker-room-microphone system and the beamformer can be combined to modified transfer functions. In particular, for each microphone signal, k, and each filter order, i, a modified transfer function $F_{k,i}$ may be defined as:

$$F_{k,i}(e^{j\Omega_\mu}) = \sum_l H_{k,l}(e^{j\Omega_\mu}) G_{k,i-l}(e^{j\Omega_\mu}).$$

Assuming an arbitrary steering direction, i.e. constant, time invariant relative time delays ($\phi_m(n)=\phi_m$), and no noise and no wanted signal, an echo signal of the frequency band may be determined as follows:

$$D(e^{j\Omega_\mu}, n) = \sum_i X(e^{j\Omega_\mu}, n-i)[e^{j\Omega_\mu \varphi_1} F_{1,i}(e^{j\Omega_\mu}) + e^{j\Omega_\mu \varphi_2} F_{2,i}(e^{j\Omega_\mu})].$$

Therefore, the optimal choice for the filter coefficients for the acoustic echo canceller may be written as:

$$\hat{H}_{i,opt}(e^{j\Omega_\mu},\phi_1,\phi_2) = e^{j\Omega_\mu \phi_1} F_{1,i}(e^{j\Omega_\mu}) + e^{j\Omega_\mu \phi_2} F_{2,i}(e^{j\Omega_\mu}).$$

Here i denotes the filter order. In other words, each filter coefficient of a set of filter coefficients corresponding to a steering direction may be written as sum, wherein each summand is a product between a time delay function, i.e. $\exp(j\Omega_\mu \phi_m)$, and a modified transfer function, i.e. $F_{m,i}$, wherein m denotes the respective microphone signal.

The relative time delays may be determined based on the position of the wanted sound source and/or the direction of arrival of a signal originating from the wanted sound source. Hence, the complex factors $\exp(j\Omega_\mu \phi_1)$ and $\exp(j\Omega_\mu \phi_2)$ are known or may be calculated, while the modified transfer functions, in particular $F_{1,i}$ and $F_{2,i}$, are initially unknown. Once the modified transfer functions are determined, a set of filter coefficients for an acoustic echo canceller may be determined for a current or arbitrary steering direction using the above-described equation for the filter coefficients of the acoustic echo canceller.

The modified transfer functions may be calculated based on the provided sets of filter coefficients. The determination of the current set of filter coefficients may be performed by filter coefficients determining module 108 shown in FIG. 1.

The provided sets of filter coefficients may correspond to a predetermined number of steering directions, wherein the predetermined number of steering directions is at least equal to the number of microphones in the microphone array. The provided sets of filter coefficients may be determined during an initializing phase.

Figure 4:
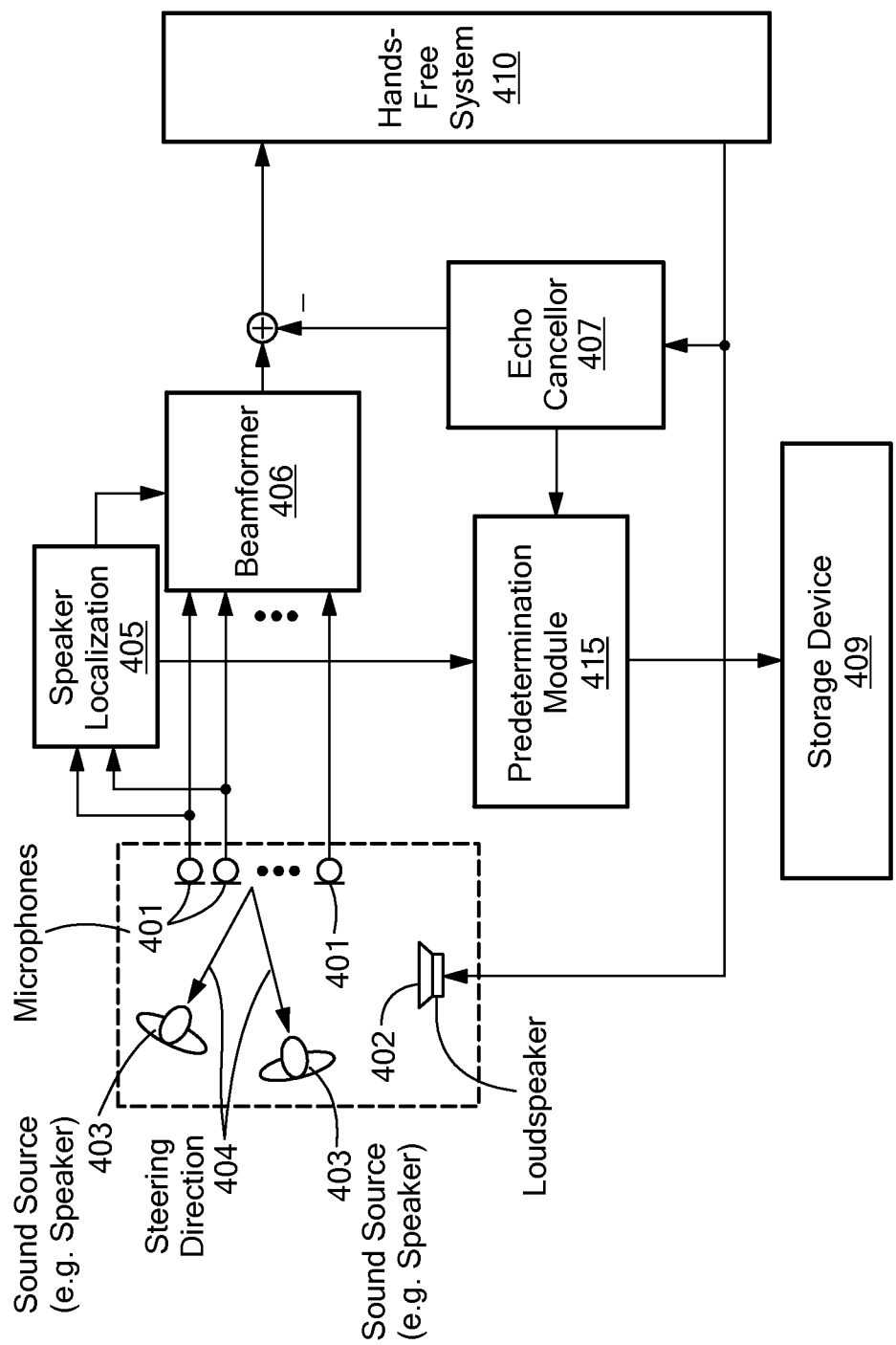
FIG. 4 shows an example of a beamformer arrangement comprising a predetermination module and a storage device.

In FIG. 4, a beamformer arrangement is shown wherein predetermination module 415 may be used during an initializing phase to determine sets of filter coefficients corresponding to different steering directions and to store the sets of filter coefficients and steering directions in storage device 409. In this way, the provided sets of filter coefficients may be obtained. The time delays for the microphone signals corresponding to the different steering directions may also be determined and/or stored by predetermination module 415, thereby obtaining predetermined time delays. Furthermore, a beamformer 406, speaker localization module 405, a loudspeaker 402, microphones 401, speaker 403, an acoustic echo canceller 407, different steering directions 404 of the beamformer 406 and a hands-free system 410 are shown.

Figure 5:
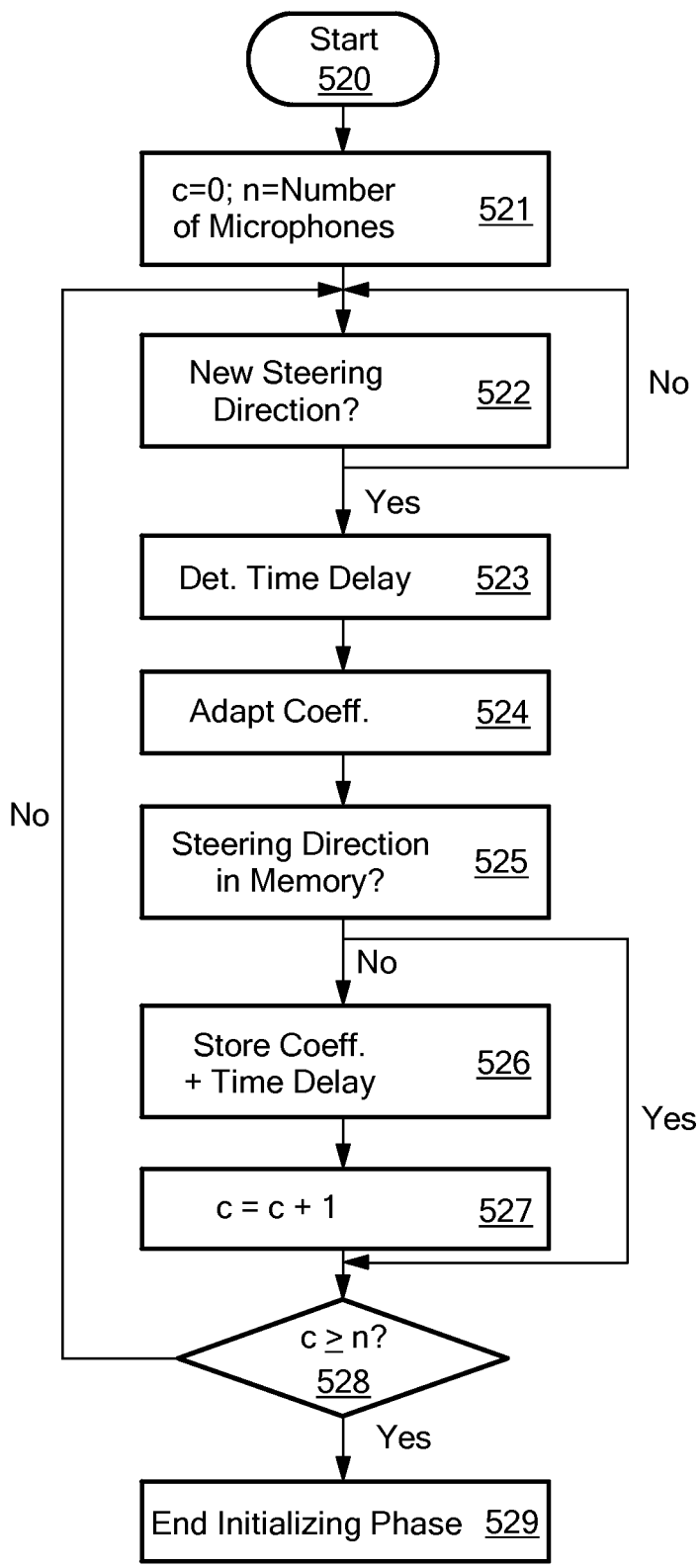
FIG. 5 shows selected steps of an initializing phase.

Selected steps of the initializing phase are shown in FIG. 5. After initializing the beamformer arrangement at step 520, the number of microphones, n, in the microphone array is determined and a counter-parameter, c, is set to zero, i.e. c=0. At step 522 it is determined whether the beamformer changed from one steering direction to a new steering direction, i.e. whether the provided steering direction deviates from a preset steering direction or whether the provided steering direction is the first steering direction to be set. If the provided steering direction is a new steering direction, a beamformer may be used to determine the time delays of the microphone signals, in particular the relative time delays with respect to an arbitrary reference microphone signal, corresponding to the provided steering direction and to output a beamformed signal.

At step 524, the filter coefficients for the acoustic echo canceller are adapted, in particular, the adaptation step is performed such that the quality of echo compensation according to a predetermined criterion exceeds a predetermined threshold (for determining the quality of echo compensation see, for example, "Acoustic Echo and Noise Control" by E. Hänsler and G. Schmidt, Chapter 13, John Wiley & Sons, 2004). At step 525, it is checked whether the provided steering direction and a correspondingly adapted set of filter coefficients are already stored in a memory. If an adapted set of filter coefficients corresponding to the provided steering direction is not yet stored in the memory, the set of filter coefficients and relative time delays are stored in the memory at step 526. At step 527, the counter-parameter is increased by 1. Finally, at step 528, it is checked whether the counter-parameter equals or exceeds the number of microphones in the microphone array. If so, the initializing phase is terminated at step 529 and sets of filter coefficients can be provided, otherwise, the initializing phase returns to step 522.

Figure 6:
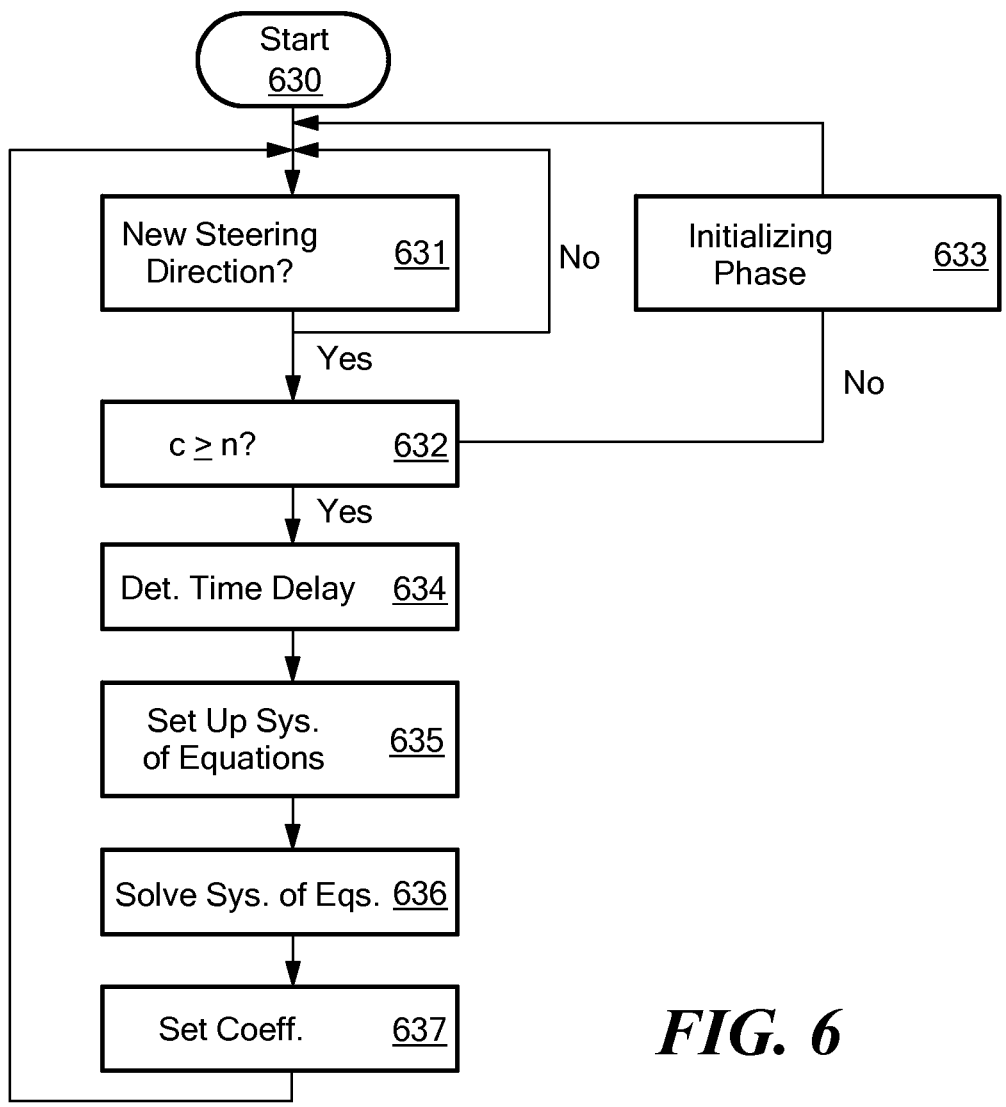
FIG. 6 shows selected steps of determining a set of filter coefficients for an acoustic echo canceller.

FIG. 6 shows selected steps of a method for determining a set of filter coefficients for an acoustic echo canceller. After initializing the beamformer arrangement at step 630, it is checked whether the current steering direction is a new steering direction in step 631, i.e. whether the current steering direction deviates from a preset steering direction. In the first pass of the method after initializing the beamformer arrangement, an arbitrary steering direction may be set, which is then a new steering direction. If during operation of the system the beamformer does not change to a different steering direction and hence, step 631 yields a negative answer, the beamforming and echo compensation may be performed with preset filter coefficients of the beamformer and the acoustic echo canceller, respectively.

If the beamformer has changed to a new steering direction, it is determined at step 632 whether a counter-parameter, indicating a predetermined number of steering directions for which sets of filter coefficients for the acoustic echo canceller are provided, exceeds or equals the number of microphones in the microphone array. If the counter-parameter does not equal or exceed the number of microphones, the method returns to the initializing phase 633, for example to step 523 of FIG. 5. If the counter-parameter equals or exceeds the number of microphones, a relative time delay for each microphone signal is determined at step 634 corresponding to the current steering direction. At step 635, a system of equations based on the provided sets of filter coefficients and predetermined time delays is set up. At step 636, the system of equations is solved. Determining a solution to the system of equations may comprise inverting a matrix.

From the solutions of the system of equations, which correspond to modified transfer functions, a set of filter coefficients for the acoustic echo canceller is determined and set at step 637.

After the current set of filter coefficients has been determined, the current set of filter coefficients may be stored in the memory, thereby forming a preset or provided set of filter coefficients, in order to increase the number of provided sets of filter coefficients.

The determined current set of filter coefficients may also replace a provided set of filter coefficients if the quality of echo compensation using the determined current set of filter coefficients exceeds the quality of echo compensation using a particular set of filter coefficients within the provided sets of filter coefficients corresponding to a particular predetermined steering direction.

The determined current set of filter coefficients may also replace the oldest provided set of filter coefficients. The oldest provided set of filter coefficients may be the provided set of filter coefficients for which a time stamp, indicating the time when the set of filter coefficients has been determined, lies furthest in the past, in particular compared to the times of all other provided sets of filter coefficients.

Figure 7:
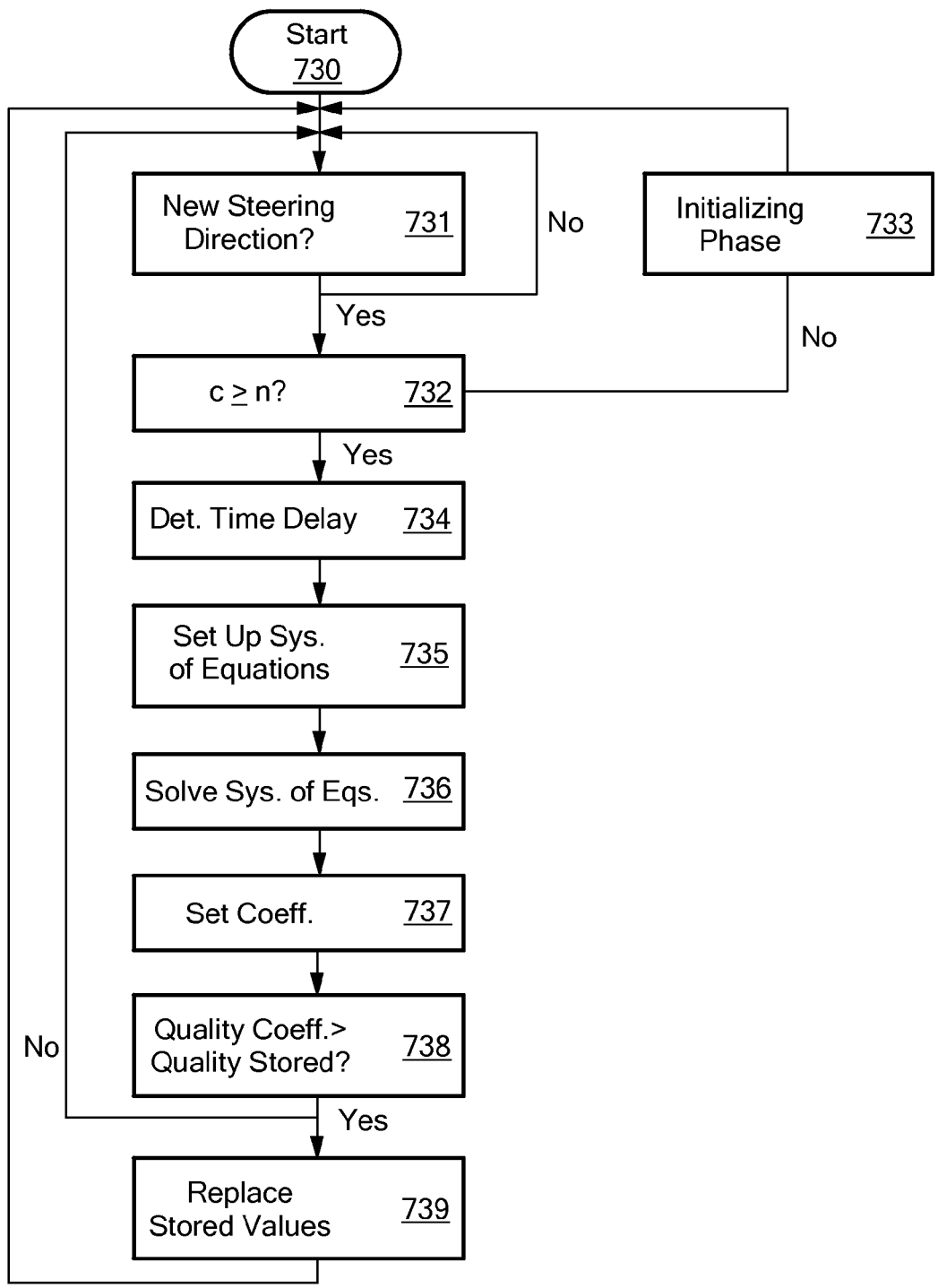
FIG. 7 shows selected steps of replacing a provided set of filter coefficients with a determined set of filter coefficients.

In FIG. 7, selected steps of a replacement of a provided set of filter coefficients are shown. Step 730 to 737 correspond to steps 630 to 637 in FIG. 6. At step 738 of FIG. 7, it is determined whether the quality of echo compensation using the determined current set of filter coefficients exceeds the quality of echo compensation using any of the provided sets of filter coefficients. A particular set of filter coefficients within the provided sets of filter coefficients may be searched, wherein the quality of echo compensation using the determined current set of filter coefficients exceeds the quality of echo compensation using the particular set of filter coefficients and wherein a set of steering directions comprising the current steering direction and all predetermined steering directions other than the predetermined steering direction corresponding to the particular set of filter coefficients, contains a predetermined number of steering directions which is at least equal to the number of microphones in the microphone array. If such a particular set of filter coefficients is found, the particular set of filter coefficients may be replaced by the determined coefficients at step 739.

In particular, the quality of echo compensation using the particular set of coefficients may be worse than the quality of echo compensation using any other provided set of filter coefficients and the respective predetermined steering direction and/or predetermined time delays.

In the following, an example for determining a set of filter coefficients for an acoustic echo compensator, in particular of an acoustic echo canceller, in a beamformer arrangement is detailed, wherein the beamformer arrangement comprises a microphone array comprising two microphones.

In a memory or storage device, sets of filter coefficients for an echo canceller for a predetermined number of steering direction may be stored together with corresponding parameters for time delay compensation. In the case of two microphones in the microphone array, the predetermined number of steering directions has to be at least equal to 2. In this example, the set of parameters $$\hat{H}_i(e^{j\Omega_\mu}, n_0), \phi_1, \phi_2 \text{ and}$$

$$\hat{H}_i(e^{j\Omega_\mu}, n_1), \tilde{\phi}_1, \tilde{\phi}_2$$

is provided and comprises two sets of filter coefficients, $\hat{H}_i(e^{j\Omega_\mu}, n_0)$ and $\hat{H}_i(e^{j\Omega_\mu}, n_1)$, respectively. Here $\hat{H}$ denotes the provided set of filter coefficient, $n_0$ and $n_1$, denote the time for which the respective set of filter coefficients has been determined and $\phi_1$, $\phi_2$, $\tilde{\phi}_1$ and $\tilde{\phi}_2$ denote the relative time delays of the microphone signals 1 and 2, respectively, corresponding to two different predetermined steering directions, i.e.

$$\phi_1 \neq \tilde{\phi}_1,$$

$$\phi_2 \neq \tilde{\phi}_2.$$

As the number of predetermined steering directions equals the number of microphones in the microphone array of this example, the initializing phase may be deemed to be finished.

The number of filter coefficients in a set of provided filter coefficients for each steering direction of the predetermined number of steering directions, may depend on the desired filter order used, for example, for an FIR filter.

In particular, the number of provided filter coefficients in a set of provided filter coefficients corresponding to a given steering direction may equal the desired filter order used or the number of filter coefficients that should be determined for the current set of filter coefficients. In other words, the number of provided filter coefficients per steering direction may be equal to or larger than 1.

When, for example, due to the movement of a speaker, the beamformer changes from a preset steering direction to a current steering direction, current time delays $\theta_1$ and $\theta_2$ may be determined for the respective microphone signals corresponding to the current steering direction. The optimal filter coefficients for the acoustic echo canceller may be written as $$\hat{H}_{i,opt}(e^{j\Omega_\mu}, \theta_1, \theta_2) = e^{j\Omega_\mu \theta_1} F_{1,i}(e^{j\Omega_\mu}) + e^{j\Omega_\mu \theta_2} F_{2,i}(e^{j\Omega_\mu}).$$

If the optimal filter coefficients could be determined based on the provided sets of filter coefficients and the predetermined time delays, an impaired signal quality for a certain could be avoided. Hence, it will be desirable to find the optimal filter coefficients as a function of known quantities, in particular of the provided sets of filter coefficients, i.e.

$$\hat{H}_{i,opt}(e^{j\Omega_\mu},\theta_1,\theta_2)=f(\hat{H}_i(e^{j\Omega_\mu},n_0),\hat{H}_i(e^{j\Omega_\mu},n_1),\phi_1,\phi_2,\tilde{\phi}_1,\tilde{\phi}_2,\theta_1,\theta_2)$$

For this purpose, based on the above-described equation for $\hat{H}_{i,opt}$, equations for the optimal filter coefficients for the predetermined steering directions, corresponding to the predetermined time delays of the microphone signals, i.e. $(\phi_1,\phi_2)$ and $(\tilde{\phi}_1,\tilde{\phi}_2)$, may be formed. These equations may read:

$$\hat{H}_{i,opt}(e^{j\Omega_\mu},\phi_1,\phi_2)=e^{j\Omega_\mu\phi_1}F_{1,i}(e^{j\Omega_\mu})+e^{j\Omega_\mu\phi_2}F_{2,i}(e^{j\Omega_\mu}), \text{ and}$$

$$\hat{H}_{i,opt}(e^{j\Omega_\mu},\tilde{\phi}_1,\tilde{\phi}_2)=e^{j\Omega_\mu\tilde{\phi}_1}F_{1,i}(e^{j\Omega_\mu})+e^{j\Omega_\mu\tilde{\phi}_2}F_{2,i}(e^{j\Omega_\mu}).$$

This system of equations may be solved. In this case, weighted differences may be calculated as follows:

$$e^{j\Omega_\mu\tilde{\phi}_1}\hat{H}_{i,opt}(e^{j\Omega_\mu},\phi_1,\phi_2)-e^{j\Omega_\mu\phi_1}\hat{H}_{i,opt}(e^{j\Omega_\mu},\tilde{\phi}_1,\tilde{\phi}_2)=F_{2,i}(e^{j\Omega_\mu})[e^{j\Omega_\mu(\tilde{\phi}_2+\phi_1)}-e^{j\Omega_\mu(\phi_2+\tilde{\phi}_1)}],$$

$$e^{j\Omega_\mu\tilde{\phi}_2}\hat{H}_{i,opt}(e^{j\Omega_\mu},\phi_1,\phi_2)-e^{j\Omega_\mu\phi_2}\hat{H}_{i,opt}(e^{j\Omega_\mu},\tilde{\phi}_1,\tilde{\phi}_2)=F_{2,i}(e^{j\Omega_\mu})[e^{j\Omega_\mu(\phi_1+\tilde{\phi}_2)}-e^{j\Omega_\mu(\tilde{\phi}_1+\phi_2)}],$$

and solved for the modified transfer functions, $F_{1,i}$ and $F_{2,i}$, respectively, to obtain:

$$F_{1,i}(e^{j\Omega_\mu}) = \frac{e^{j\Omega_\mu\tilde{\varphi}_2}\hat{H}_{i,opt}(e^{j\Omega_\mu},\varphi_1,\varphi_2) - e^{j\Omega_\mu\varphi_2}\hat{H}_{i,opt}(e^{j\Omega_\mu},\tilde{\varphi}_1,\tilde{\varphi}_2)}{e^{j\Omega_\mu(\varphi_1+\tilde{\varphi}_2)} - e^{j\Omega_\mu(\tilde{\varphi}_1+\varphi_2)}}, \text{ and}$$

$$F_{2,i}(e^{j\Omega_\mu}) = \frac{e^{j\Omega_\mu\tilde{\varphi}_1}\hat{H}_{i,opt}(e^{j\Omega_\mu},\varphi_1,\varphi_2) - e^{j\Omega_\mu\varphi_1}\hat{H}_{i,opt}(e^{j\Omega_\mu},\tilde{\varphi}_1,\tilde{\varphi}_2)}{e^{j\Omega_\mu(\tilde{\varphi}_2+\varphi_1)} - e^{j\Omega_\mu(\tilde{\varphi}_2+\varphi_1)}}.$$

In this way, the optimal impulse responses or optimal transfer functions of the loudspeaker-room-microphone-beamformer system may be estimated by the corresponding optimal filter coefficients for the acoustic echo canceller, which may be determined as follows:

$$\hat{H}_{i,opt}(e^{j\Omega_\mu},\vartheta_1,\vartheta_2) =$$
$$f(\hat{H}_i(e^{j\Omega_\mu},n_0),\hat{H}_i(e^{j\Omega_\mu},n_1),\varphi_1,\tilde{\varphi}_1,\varphi_2,\tilde{\varphi}_2,\vartheta_1,\vartheta_2) =$$

$$e^{j\Omega_\mu\vartheta_1}\frac{e^{j\Omega_\mu\tilde{\varphi}_2}\hat{H}_{i,opt}(e^{j\Omega_\mu},\varphi_1,\varphi_2) - e^{j\Omega_\mu\varphi_2}\hat{H}_{i,opt}(e^{j\Omega_\mu},\tilde{\varphi}_1,\tilde{\varphi}_2)}{e^{j\Omega_\mu(\varphi_1+\tilde{\varphi}_2)} - e^{j\Omega_\mu(\tilde{\varphi}_1+\varphi_2)}} +$$

$$e^{j\Omega_\mu\vartheta_2}\frac{e^{j\Omega_\mu\varphi_1}\hat{H}_{i,opt}(e^{j\Omega_\mu},\varphi_1,\varphi_2) - e^{j\Omega_\mu\varphi_1}\hat{H}_{i,opt}(e^{j\Omega_\mu},\tilde{\varphi}_1,\tilde{\varphi}_2)}{e^{j\Omega_\mu(\tilde{\varphi}_2+\varphi_1)} - e^{j\Omega_\mu(\tilde{\varphi}_2+\varphi_1)}}.$$

Using the provided sets of filter coefficients as estimate for the optimal sets of filter coefficients corresponding to the predetermined time delays, this yields following estimate for the initialization of the filter coefficients of the acoustic echo canceller at time $n_2$, which may correspond to the time when the beamformer changes to the current steering direction:

$$\hat{H}_i(e^{j\Omega_\mu},n_2) = e^{j\Omega_\mu\vartheta_1}\frac{e^{j\Omega_\mu\tilde{\varphi}_2}\hat{H}_i(e^{j\Omega_\mu},n_0) - e^{j\Omega_\mu\varphi_2}\hat{H}_i(e^{j\Omega_\mu},n_1)}{e^{j\Omega_\mu(\varphi_1+\tilde{\varphi}_2)} - e^{j\Omega_\mu(\tilde{\varphi}_1+\varphi_2)}} +$$

$$e^{j\Omega_\mu\vartheta_2}\frac{e^{j\Omega_\mu\varphi_1}\hat{H}_i(e^{j\Omega_\mu},n_0) - e^{j\Omega_\mu\varphi_1}\hat{H}_i(e^{j\Omega_\mu},n_1)}{e^{j\Omega_\mu(\tilde{\varphi}_2+\varphi_1)} - e^{j\Omega_\mu(\tilde{\varphi}_2+\varphi_1)}}.$$

By using this calculated set of filter coefficients after the beamformer changes to the current steering direction, a residual echo in the beamformed signal may be reduced or completely cancelled, without the need of a complete re-adaptation of the acoustic echo canceller.

The generalization of this example to M microphones is straightforward. A filter coefficients vector, $\hat{H}(i)$, of the acoustic echo canceller may be defined, wherein each element of $\hat{H}(i)$ corresponds to a filter coefficient of the same arbitrary filter order, i, but corresponding to different predetermined steering directions. The above-described system of equations may then be written, for example, as matrix multiplication between a matrix, A, comprising coefficients which comprise time delay functions, and a transfer vector, f, of modified transfer functions, i.e.

$$\hat{H}(i)=Af.$$

Each element of the transfer vector corresponds to a modified transfer function for a different microphone signal, but for the same arbitrary filter order, i, i.e. $F_{k,i}$. To find the modified transfer functions, the matrix A has to be inverted, i.e.

$$f=A^{-1}\hat{H}(i).$$

These steps may be performed for each desired filter order, i.

In the previously discussed example, the number of microphones in the microphone array was equal to 2, i.e. M=2. In this case, the filter coefficients vector, the transfer vector and the matrix A read:

$$\hat{H}(i) = \begin{pmatrix} \hat{H}_i(e^{j\Omega_\mu},\varphi_1,\varphi_2) \\ \hat{H}_i(e^{j\Omega_\mu},\tilde{\varphi}_1,\tilde{\varphi}_2) \end{pmatrix},$$

$$f = \begin{pmatrix} F_{1,i} \\ F_{2,i} \end{pmatrix}, \text{ and}$$

$$A = \begin{pmatrix} e^{j\Omega_\mu\varphi_1} & e^{j\Omega_\mu\varphi_2} \\ e^{j\Omega_\mu\tilde{\varphi}_1} & e^{j\Omega_\mu\tilde{\varphi}_2} \end{pmatrix}.$$

Inverting matrix A may be performed analytically or numerically. Knowing the transfer vector of modified transfer functions, a set of filter coefficients for the acoustic echo canceller may be calculated analogously as described in the above-mentioned examples.

If the predetermined number of steering directions equals the number of microphones in the microphone array, and a current or arbitrary steering direction is set or provided, the current set of filter coefficients for the acoustic echo canceller may be determined as described above. After a short period of time it may be checked whether the quality of echo compensation exceeds a predetermined threshold. In this case, the determined current set of filter coefficients, the current steering direction and/or the current relative time delays corresponding to the current steering direction may be stored in a memory together with the provided sets of filter coefficients and predetermined time delays. The set of current steering direction, in particular, current time delays, and current set of filter coefficients may replace a provided set of filter coefficients and the corresponding predetermined steering direction. It may, for instance, replace the oldest or worst provided set of filter coefficients. In the latter case, an additional parameter may be stored together with each provided set of filter coefficients, which describes the quality of echo compensation at or for the time when the provided set of filter coefficients was determined.

The current steering direction and the determined current set of filter coefficients may also be stored additionally to the provided set of filter coefficients to increase the number of equations in the systems of equations as described above.

A second beamformer and a second acoustic echo canceller may be used to update the oldest provided set of filter coefficients for the acoustic echo canceller. For this purpose, the time delay parameters of the second beamformer may be set to be the predetermined relative time delays corresponding to the oldest provided set of filter coefficients and the second acoustic echo canceller may be used to adapt for that predetermined steering direction. If the quality of echo compensation exceeds a predetermined threshold, the so-determined set of filter coefficients may be used to replace the oldest provided set of filter coefficients.

The embodiments of the invention described above are intended to be merely exemplary; numerous variations and modifications will be apparent to those skilled in the art. All such variations and modifications are intended to be within the scope of the present invention as defined in any appended claims.

Although the previously discussed embodiments of the present invention have been described separately, it is to be understood that some or all of the above described features can also be combined in different ways. The discussed embodiments are not intended as limitations but serve as examples illustrating features and advantages of the invention. The embodiments of the invention described above are intended to be merely exemplary; numerous variations and modifications will be apparent to those skilled in the art. All such variations and modifications are intended to be within the scope of the present invention as defined in any appended claims.

It should be recognized by one of ordinary skill in the art that the foregoing methodology may be performed in a signal processing system (e.g. speech processing) and that the speech processing system may include one or more processors for processing computer code representative of the foregoing described methodology. The computer code may be embodied on a tangible computer readable storage medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.).

What is claimed is:

1. A method for determining a set of filter coefficients for an acoustic echo compensator in a beamformer arrangement, wherein the beamformer arrangement comprises a microphone array comprising at least two microphones, a beamformer yielding a beamformed signal based on microphone signals from each of the at least two microphones and an acoustic echo compensator operating on the beamformed signal for echo compensation of the beamformed signal, the method comprising:

providing from memory a plurality of sets of filter coefficients for the acoustic echo compensator, each set of filter coefficients corresponding to one of a predetermined number of steering directions of the beamformer arrangement, wherein the predetermined number of steering directions is equal to or greater than the number of microphones in the microphone array;

determining time delays for the microphones for a current steering direction, wherein the current steering direction is not one of the predetermined number of steering directions corresponding to any one of the sets of filter coefficients stored in the memory; and computing, using a computer processor, an estimate for a current set of filter coefficients for the current steering direction from the time delays for the microphones for the current steering direction and from first and second ones of the plurality of sets of filter coefficients for the acoustic echo compensator which correspond to different ones of the steering directions that are stored in the memory.

2. The method according to claim 1, wherein the method operates in a loudspeaker-room-microphone system and calculating a current set of filter coefficients comprises:
for each filter coefficient of the current set of filter coefficients, computing a sum, wherein each summand comprises a modified transfer function corresponding to a combination of (a) filter coefficients of the beamformer and (b) transfer functions, in particular transfer functions of the loudspeaker-room-microphone system.

3. The method according to claim 2, wherein determining the sum comprises determining the modified transfer functions based on the provided sets of filter coefficients, in particular, wherein determining the modified transfer functions is further based on predetermined time delays corresponding to predetermined steering directions of the predetermined number of steering directions.

4. The method according to claim 2, wherein the modified transfer functions are independent of the current steering direction and/or wherein each summand of the sum further comprises a time delay function, wherein the time delay function is a function of the current time delay of the microphone signal corresponding to the summand.

5. The method according to claim 1, wherein providing comprises:
for each of the predetermined number of steering directions, determining a time delay for each microphone signal corresponding to the predetermined steering direction, and storing the time delay for each microphone signal.

6. The method according to claim 1, wherein providing comprises:
for each of the predetermined number of steering directions,
adapting the acoustic echo compensator for the predetermined steering direction; and
storing in memory a set of filter coefficients of the acoustic echo compensator corresponding to the predetermined steering direction, in particular, wherein adapting the acoustic echo compensator is performed such that the quality of echo compensation exceeds a predetermined threshold.

7. The method according to claim 1, wherein:
determining whether the current steering direction deviates or differs from a preset steering direction; and
in response to finding that the current steering direction deviates or differs from the preset steering direction, performing the step of calculating the current set of filter coefficients.

8. The method according to claim 1, wherein calculating a current set of filter coefficients is followed by storing in memory the current set of filter coefficients and the current steering direction.

9. The method according to according to claim 1, further comprising determining the quality of echo compensation corresponding to a set of filter coefficients and the corresponding steering direction, according to a predetermined criterion.

10. The method according to claim 9, further comprising:
searching among the provided set of filter coefficients for a particular set of filter coefficients,
wherein the quality of echo compensation using the current set of filter coefficients exceeds the quality of echo compensation using the particular set of filter coefficients, and wherein a set of steering directions comprising the current steering direction and all predetermined steering directions other than the predetermined steering direction corresponding to the particular set of filter coefficients, contains a predetermined number of steering directions which is at least equal to the number of microphones in the microphone array; and
in response to finding such a particular set of filter coefficients:
replacing the particular set of filter coefficients and the corresponding predetermined steering direction with the determining calculated current set of filter coefficients and the corresponding current steering direction.

11. A computer program product, comprising one or more non-transitory computer readable storage media having computer-executable instructions for determining a set of filter coefficients for an acoustic echo compensator in a beamformer arrangement, the computer instructions comprising:
computer code for providing a plurality of sets of filter coefficients for the acoustic echo compensator, each set of filter coefficients corresponding to one of a predetermined number of steering directions of the beamformer arrangement, wherein the predetermined number of steering directions is equal to or greater than the number of microphones in the microphone array;
computer code for determining time delays for the microphones for a current steering direction, wherein the current steering direction is not one of the predetermined number of steering directions corresponding to any one of the sets of filter coefficients stored in the memory; and
computer code for computing an estimate for a current set of filter coefficients for the current steering direction from the time delays for the microphones for the current steering direction and from first and second ones of the plurality of sets of filter coefficients for the acoustic echo compensator which correspond to different ones of the steering directions that are stored in the memory.

12. The computer program product according to claim 11, wherein the computer code for calculating a current set of filter coefficients comprises:
for each filter coefficient of the current set of filter coefficients, computer code for computing a sum, wherein each summand comprises a modified transfer function corresponding to a combination of (a) filter coefficients of the beamformer and (b) transfer functions, in particular transfer functions of the loudspeaker-room-microphone system.

13. The computer program product according to claim 12, wherein the computer code for determining the sum comprises:
computer code for determining the modified transfer functions based on the provided sets of filter coefficients, wherein determining the modified transfer functions is further based on predetermined time delays corresponding to predetermined steering directions of the predetermined number of steering directions.

14. The computer program product according to claim 12, wherein the modified transfer functions are independent of the current steering direction and/or wherein each summand of the sum further comprises a time delay function, wherein the time delay function is a function of the current time delay of the microphone signal corresponding to the summand.

15. The computer program product according to claim 11, wherein the computer code for providing comprises for each of the predetermined number of steering directions computer code for determining a time delay for each microphone signal corresponding to the predetermined steering direction, and storing the time delay for each microphone signal.

16. The computer program product according to claim 11, wherein the computer code for providing comprises for each of the predetermined number of steering directions adapting the acoustic echo compensator for the predetermined steering direction, and storing a set of filter coefficients of the acoustic echo compensator corresponding to the predetermined steering direction, in particular, wherein the step of adapting the acoustic echo compensator is performed such that the quality of echo compensation exceeds a predetermined threshold.

17. The computer program product according to claim 11, wherein:
the computer code for calculating a current set of filter coefficients is preceded by computer code for determining whether the current steering direction deviates or differs from a preset steering direction; and computer code for calculating the current set of filter coefficients if the current steering direction deviates or differs from the preset steering direction.

18. The computer program product according to claim 11, wherein the computer code for calculating a current set of filter coefficients is followed by computer code for storing the current set of filter coefficients and the current steering direction.

19. The computer program product according to claim 11, further comprising: computer code for determining the quality of echo compensation corresponding to a set of filter coefficients and the corresponding steering direction, according to a predetermined criterion.

20. The computer program product according to claim 19, further comprising:
computer code for searching among the provided set of filter coefficients a particular set of filter coefficients, wherein the quality of echo compensation using the current set of filter coefficients exceeds the quality of echo compensation using the particular set of filter coefficients, and
wherein a set of steering directions comprising the current steering direction and all predetermined steering directions other than the predetermined steering direction corresponding to the particular set of filter coefficients, contains a predetermined number of steering directions which is at least equal to the number of microphones in the microphone array; and if such a particular set of filter coefficients is found:
replacing the particular set of filter coefficients and the corresponding predetermined steering direction with the determining calculated current set of filter coefficients and the corresponding current steering direction.

21. A system for echo compensation in a beamformer arrangement, the system comprising:
a beamformer arrangement comprising:
a microphone array comprising at least two microphones, and
a speaker localization module for receiving microphone signals from each of the at least two microphones and generating from the microphone signals a beamformed signal representative of a current steering direction;
a memory for storing a plurality of sets of filter coefficients, each set of filter coefficients corresponding to one of a predetermined number of steering directions of the beamformer arrangement, wherein the predetermined number of steering directions is equal to or greater than the number of microphones in the microphone array;
a filter coefficient determination module configured:
to receive the beamformed signal representative of the current steering direction, wherein the current steering direction is not one of the predetermined number of steering directions corresponding to any one of the sets of filter coefficients stored in memory;
to determine time delays for the microphones based upon the beamformed signal for the current steering direction;
to provide first and second ones of the plurality of sets of filter coefficients stored in the memory; and
to compute, using a computer processor, an estimate for a current set of filter coefficients for the current steering direction, wherein the estimate is calculated based upon the determined time delays and based on the first and second sets of provided filter coefficients; and
an acoustic echo compensator receiving the estimated current filter coefficients and adaptively filtering the beamformed signal for echo compensation of the beamformed signal.

* * * * *